United States Patent [19]

Holtschmidt et al.

[11] 3,896,171

[45] July 22, 1975

[54] 1-DODECYLAMINOMETHYL-2-AMINO-CYCLOPENTANE

[75] Inventors: Ulrich Holtschmidt, Essen; Günter Schwarzmann, Essen-Überruhr, both of Germany

[73] Assignee: Th. Goldschmidt AG, Germany

[22] Filed: July 30, 1973

[21] Appl. No.: 383,679

[30]    Foreign Application Priority Data

Sept. 13, 1972    Germany.............................. 2244778

[52] U.S. Cl............ 260/563 R; 424/325; 260/585 A
[51] Int. Cl.$^2$......................................... C07C 87/38
[58] Field of Search ......... 260/585 A, 563; 424/325

[56]    References Cited

UNITED STATES PATENTS 3,227,761    1/1966    DeBrunner et al. ............ 260/585 A

*Primary Examiner*—Lewis Gotts
*Assistant Examiner*—D. R. Phillips
*Attorney, Agent, or Firm*—James E. Bryan

[57]    ABSTRACT

This invention relates to the novel microbiocidally active compound 1-dodecylaminomethyl-2-aminocyclopentane, and to a process for the preparation thereof. The invention also relates to a microbiocidally active composition including the microbiocidally active compound and a carrier.

1 Claim, No Drawings

1-DODECYLAMINOMETHYL-2-AMINO-CYCLOPENTANE

The present invention relates to the new compound, with microbiocidal properties, 1-dodecylaminomethyl-2-amino-cyclopentane, as well as to a process for producing this compound, and to the use thereof as an active microbiocidal substance.

Microbiocidal action in the sense of the present invention means the destruction of Gram-positive as well as Gram-negative bacteria, fungi, and yeasts. This constitutes the primary activity thereof, but the novel compound also develops a certain efficacy with respect to viruses and algae.

In the use of microbiocidally-active compounds it is desirable that one have available a broad spectrum of diversified chemical compounds in order to prevent that resistant strains be formed in the bacteria and the like to be destroyed, and/or that strains which already have become resistant can be again combated successfully. The manufacture of a new class of microbiocidally-active compounds thus enriches the state of the art.

The present invention relates to a novel active substance which, as compared to the known active materials, has the specific advantage that it is effective especially against a number of bacteria, fungi, and yeasts which are relatively difficult to combat and which are very frequently responsible for the so-called hospitalism. This term is understood as the spreading of pathogenic germs, particularly in hospitals, which are characterized by a high resistance against microbiocidal compounds. Examples of such germs are *S. aureus*, *P. aeruginosa*, and *K. pneumoniae*.

The novel microbiocidally-active compound is 1-dodecylaminomethyl-2-amino-cyclopentane which can be represented by the following formula

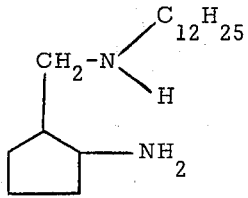

The basic diamine is without effect. The optimal effect appears with the substitution of a hydrogen, linked to the nitrogen of the aminomethyl group, by one dodecyl group. If a second dodecyl group is introduced, the solubility of the compound is impaired to such a degree that the practical use thereof from an aqueous or aqueous-alcoholic solution is no longer possible.

Instead of a $C_{12}H_{25}$ residue, a mixture of alkyl residues also may be employed, such as is obtained when the preparation of the alkyl halide is begun with a natural fatty acid mixture. However, the mean composition of the alkyl group mixture must correspond to the composition $C_{12}H_{25}$. The mixture should contain as high as possible a content of pure $C_{12}H_{25}$ alkyl.

This compound may be prepared by reacting 1-aminomethyl-2-aminocyclopentane with approximately halfmolar amounts of dodecyl halide, preferably dodecyl chloride, heating — after the termination of the exothermic reaction — for at least 1 hour to temperatures of 100° to 150°C, freeing the reaction mixture from the residue, and separating the desired compound from the reaction mixture, preferably by fractional distillation.

During the reaction with approximately halfmolar amounts of dodecyl halide, there is produced a mixture of non-reacted starting compound, the novel desired compound, and a compound which contains two and more dodecyl groups linked to nitrogen. The isolation of the desired compound is effected — as indicated above — preferably by fractional distillation.

The inventive 1-dodecylaminomethyl-2-amino-cyclopentane is not water-soluble. Since, however, the use of the inventive compound is preferably effected in aqueous or aqueous-alcoholic solutions, it is therefore necessary to use a solution aid during the production of the preparation containing this compound. Examples of suitable solution aids are, for instance, the addition products of ethylene oxide to higher alcohols, such as for example tridecyl alcohol, or cation-active compounds, such as for example dodecyl dimethylbenzylammonium-choride. These solubilizing agents are employed in approximately equal amounts based upon active substance.

The inventive compound may be mixed in solution in the customary manner, i.e., the dissolved and/or solubilized compound may be mixed together with other microbiocidal compounds and with other additions, such as odorous substances or dyestuffs. The compound also may be dissolved in fluorinated chlorinated hydrocarbons and used in aerosol form. By virtue of the addition of the solubilizing agents when using an aqueous solution, the purifying power of the solutions is enhanced at the same time, and specifically when nonionogenic tensides are used as solubilizing agents.

In the following example, the novel process will first be explained. Thereafter, the efficacy of the inventively prepared compound will be shown in table form. The testing relative to microbiocidal action was made according to the "Richtlinien der Deutschen Gesellschaft fuer Hygiene und Mikrobiologie e.V., (Guidelines of the German Society for Hygiene and Microbiology) Gustav Fischer Verlag, Stuttgart, 1959". In the tables, + means germ growth, − means no germ growth.

EXAMPLE

Preparation of 1-dodecylaminomethyl-2-amino-cyclopentane

Placed in a four-liter four-necked flask, equipped with a KPG stirrer, dropping funnel, thermometer, and reflux condenser, are 8 moles of 2-amino-methyl-2-amino-cyclopentane and 6.4 moles of NaOH. Added slowly to this mixture are 4 moles of dodecylbromide, and heating is thereafter effected at 135°C for 5 hours. The reaction mixture is then allowed to cool, and the inorganic precipitate is filtered off by suction. The filtrate is fractionally distilled. Obtained therefrom, after the removal of non-reacted amine and dodecyl bromide, are 440 grams of pure 1-dodecylaminomethyl-2-amino-cyclopentane, between 132° and 135°C and at $10^{-3}$ Torr.

Elemental analysis for $C_{18}H_{38}N_2$ (molecular weight 283):

| calculated | | found | |
|---|---|---|---|
| C | 76.5% by weight | C | 76.7% by weight |
| H | 13.6% by weight | H | 13.6% by weight |
| N | 9.9% by weight | N | 9.5% by weight |

In a further fraction, 368 grams of 1-dodecylaminomethyl-2-dodecylamino-cyclopentane pass over, between 201 and 205°C and at $10^{-3}$ Torr.

Elemental analysis for $C_{30}H_{62}N_2$ (molecular weight 451):

| calculated | | found | |
|---|---|---|---|
| C | 80.1% by weight | C | 79.5% by weight |
| H | 13.7% by weight | H | 13.7% by weight |
| N | 6.2% by weight | N | 5.8% by weight |

For the testing of the microbiocidal efficacy, the following preparations were made:

Preparation 1

10 parts by weight of 1-dodecylaminomethyl-2-amino-cyclopentane, 10 parts by weight of an addition product of 12 moles of ethylene oxide to 1 mole of iso-tridecyl alcohol, 10 parts by weight of acetic acid and 70 parts by weight of water are homogenized, while stirring, and heating to approximately 40°C. Thus obtained is a yellow-colored, clear solution which easily can be diluted with water.

Preparation 2

10 parts by weight of 1-dodecylaminomethyl-2-amino-cyclopentane, 10 parts by weight of a solution which contains 80% by weight of

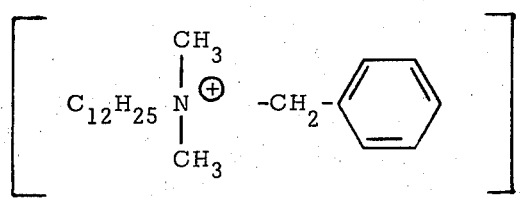

and 20% by weight of ethanol, as well as 10 parts by weight of acetic acid, and 70 parts by weight of water are homogenized, while stirring, at approximately 40°C. A yellow clear solution is obtained which can be mixed with water in any proportion.

Preparation 1

The pH value of the aqueous solution containing 0.1% of active substance was adjusted with acetic acid to 7.3.

| Test Strain | Concentration in % | 1 | 2 | 5 | 10 | 20 | 30 |
|---|---|---|---|---|---|---|---|
| S. aureus | 0.1 | − | − | − | − | − | − |
| | 0.05 | − | − | − | − | − | − |
| | 0.01 | + | + | + | + | − | − |
| | 0.005 | + | + | + | + | + | − |
| | 0.001 | + | + | + | + | + | + |
| E. coli | 0.1 | − | − | − | − | − | − |
| | 0.05 | − | − | − | − | − | − |
| | 0.01 | − | − | − | − | − | − |
| | 0.005 | + | + | − | − | − | − |

-Continued

| Test Strain | Concentration in % | 1 | 2 | 5 | 10 | 20 | 30 |
|---|---|---|---|---|---|---|---|
| | 0.001 | + | + | + | + | + | + |
| P. vulgaris | 0.1 | − | − | − | − | − | − |
| | 0.05 | − | − | − | − | − | − |
| | 0.01 | + | − | − | − | − | − |
| | 0.005 | + | + | + | − | − | − |
| | 0.001 | + | + | + | + | + | + |
| P. aeruginosa | 0.1 | − | − | − | − | − | − |
| | 0.05 | − | − | − | − | − | − |
| | 0.01 | + | − | − | − | − | − |
| | 0.005 | + | + | + | + | + | − |
| | 0.001 | + | + | + | + | + | + |
| T. mentagrophytes | 0.1 | − | − | − | − | − | − |
| | 0.05 | − | − | − | − | − | − |
| | 0.01 | − | − | − | − | − | − |
| | 0.005 | + | − | − | − | − | − |
| | 0.001 | + | − | − | − | − | − |

Preparation 2

The pH value of the aqueous solution containing 0.1% of active substance was adjusted with acetic acid to 7.6.

| Test Strain | Concentration in % | 1 | 2 | 5 | 10 | 20 | 30 |
|---|---|---|---|---|---|---|---|
| S. aureus | 0.1 | − | − | − | − | − | − |
| | 0.05 | − | − | − | − | − | − |
| | 0.01 | − | − | − | − | − | − |
| | 0.005 | + | − | − | − | − | − |
| | 0.001 | + | + | + | + | + | − |
| E. coli | 0.1 | − | − | − | − | − | − |
| | 0.05 | − | − | − | − | − | − |
| | 0.01 | − | − | − | − | − | − |
| | 0.005 | + | + | + | − | − | − |
| | 0.001 | + | + | + | + | + | + |
| P. vulgaris | 0.1 | − | − | − | − | − | − |
| | 0.05 | − | − | − | − | − | − |
| | 0.01 | + | − | − | − | − | − |
| | 0.005 | + | + | − | − | − | − |
| | 0.001 | + | + | + | + | + | + |
| P. aeruginosa | 0.1 | − | − | − | − | − | − |
| | 0.05 | − | − | − | − | − | − |
| | 0.01 | − | − | − | − | − | − |
| | 0.005 | + | + | + | + | + | − |
| | 0.001 | + | + | + | + | + | + |
| M. gypseum | 0.1 | − | − | − | − | − | − |
| | 0.05 | − | − | − | − | − | − |
| | 0.01 | − | − | − | − | − | − |
| | 0.005 | + | − | − | − | − | − |
| | 0.001 | + | + | − | − | − | − |
| K. pneumoniae | 0.1 | − | − | − | − | − | − |
| | 0.05 | − | − | − | − | − | − |
| | 0.01 | + | + | − | − | − | − |
| | 0.005 | + | + | + | + | − | − |
| | 0.001 | + | + | + | + | + | + |

Employed as a comparative substance was a mixture of equal parts by weight of hexachlorophene and the reaction product of 12 moles of ethylene oxide with tridecyl alcohol. The concentrations indicated refer to the content of hexachlorophene. The pH value of the aqueous solution was 7.7.

| Test Strain | Concentration in % | 1 | 2 | 5 | 10 | 20 | 30 |
|---|---|---|---|---|---|---|---|
| S. aureus | 0.1 | + | − | − | − | − | − |
| | 0.05 | + | − | − | − | − | − |
| | 0.01 | + | + | + | + | + | − |
| | 0.005 | + | + | + | + | + | + |
| E. coli | 1.0 | + | + | + | + | + | − |
| | 0.5 | + | + | + | + | + | + |
| P. aeruginosa | 2.0 | − | + | − | − | − | − |
| | 1.0 | + | + | + | + | − | − |
| | 0.5 | + | + | + | + | + | + |

-Continued

| Test Strain | Concentration in % | \multicolumn{6}{c}{Action time in minutes} | | | | | |
|---|---|---|---|---|---|---|---|
| | | 1 | 2 | 5 | 10 | 20 | 30 |
| C. albicans | 5.0 | + | + | + | + | + | + |
| | 2.5 | + | + | + | + | + | + |
| | 1.0 | + | + | + | + | + | + |
| P. expansum | 5.0 | + | + | + | + | + | + |
| | 2.5 | + | + | + | + | + | + |
| | 1.0 | + | + | + | + | + | + |

A comparison of the tables shows the superiority of the inventive compound with respect to its microbiocidal efficacy.

It will be obvious to those skilled in the art that many modifications may be made within the scope of the present invention without departing from the spirit thereof, and the invention includes all such modifications.

What is claimed is:

1. 1-dodecylaminomethyl-2-amino-cyclopentane.

* * * * *